US012139372B2

(12) United States Patent
Carparelli

(10) Patent No.: US 12,139,372 B2
(45) **Date of Patent: *Nov. 12, 2024**

(54) TRANSPORTATION SYSTEM

(71) Applicant: Inventio AG, Hergiswil (CH)

(72) Inventor: Donato Carparelli, Lugano (CH)

(73) Assignee: INVENTIO AG, Hergiswil (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/003,160

(22) PCT Filed: Jun. 23, 2021

(86) PCT No.: PCT/EP2021/067063
§ 371 (c)(1),
(2) Date: Dec. 23, 2022

(87) PCT Pub. No.: WO2022/002701
PCT Pub. Date: Jan. 6, 2022

(65) Prior Publication Data

US 2023/0294961 A1 Sep. 21, 2023

(30) Foreign Application Priority Data

Jun. 30, 2020 (EP) .................................... 20183273

(51) Int. Cl.
*B66B 11/00* (2006.01)
*B66B 1/06* (2006.01)

(52) U.S. Cl.
CPC .............. *B66B 11/005* (2013.01); *B66B 1/06* (2013.01); *B66B 11/002* (2013.01); *B66B 11/0095* (2013.01)

(58) Field of Classification Search
CPC ..... B66B 19/002; B66B 19/04; B66B 11/005; B66B 2201/308; B66B 2201/307; B66B 11/0095; B66B 5/286; B66B 11/06
See application file for complete search history.

(56) References Cited

U.S. PATENT DOCUMENTS

| | | | | |
|---|---|---|---|---|
| 5,433,293 | A | 7/1995 | Sager | |
| 2023/0271809 | A1 * | 8/2023 | Carparelli | B66B 11/005 187/249 |

FOREIGN PATENT DOCUMENTS

| | | | | | |
|---|---|---|---|---|---|
| CN | 109850721 | A * | 6/2019 | | |
| CN | 110065877 | A * | 7/2019 | | |
| EP | 615946 | A1 * | 9/1994 | B66B 7/022 | |
| EP | 2746211 | A1 * | 6/2014 | B66B 19/00 | |

(Continued)

*Primary Examiner* — Diem M Tran
(74) *Attorney, Agent, or Firm* — Shumaker, Loop & Kendrick, LLP; William J. Clemens

(57) ABSTRACT

A transportation system for a building with multiple floors includes a shaft, a traction sheave drive type elevator and a lift. The elevator that vertically conveys persons has an elevator car which is movable in the shaft and at least two counterweights which are movable together with the car in the shaft in a direction of movement opposite to the direction of movement of the elevator car. The elevator car and the counterweights are driven by drive engines with traction sheaves. The lift that vertically conveys objects may be a self-propelled lift. A lift platform of the lift overlaps at least partly a vertical projection of the elevator car, whereby preferably the vertical projection of the lift platform is smaller than the vertical projection of the elevator car.

16 Claims, 4 Drawing Sheets

(56) References Cited

FOREIGN PATENT DOCUMENTS

| | | | | | |
|---|---|---|---|---|---|
| EP | 3093263 | A1 | * | 11/2016 | ............. B66B 17/14 |
| JP | H061562 | A | * | 1/1994 | |
| JP | 3252575 | B2 | | 11/2001 | |
| JP | 2006176286 | A | | 7/2006 | |
| WO | 2017077182 | A2 | | 5/2017 | |
| WO | WO-2017102684 | A1 | * | 6/2017 | ............. B66B 19/00 |
| WO | 2018189110 | A1 | | 10/2018 | |
| WO | WO-2019238530 | A1 | * | 12/2019 | ........... B66B 19/002 |
| WO | 2020127303 | A1 | | 6/2020 | |
| WO | 2020127787 | A1 | | 6/2020 | |

* cited by examiner

TRANSPORTATION SYSTEM

FIELD

The present invention relates to a transportation system for a building with multiple floors. The building comprises a shaft which forms the basis for an elevator for vertically conveying persons and a lift for vertically conveying objects.

BACKGROUND

It is well known that an elevator in a building serves for transporting a person from one floor to another floor. For this purpose, the person inputs a call, for example, on a call input terminal on the entry floor and an elevator car responding to the call transports the person to a desired destination floor. Hereto, traction sheave drive type elevators are established and particularly successful for many years, whereby the elevators contain elevator cars that can be moved by means of a drive engine having a traction sheave using suspension means, for example in the form of cables or belts upwards and downwards in a shaft. Generally, the elevator car comprises a cuboid car body that has a floor, doors, side walls, a rear wall and a ceiling. The passengers stand in the interior of the car body as the car moves.

Beside persons as mentioned above, there is also a need for vertically conveying unmanned objects in a building. For example, the use of autonomous vehicles, robots and other unmanned objects in buildings is increasing. Due to the rising internet purchases ordered goods, at the best, must be delivered to the door of the purchaser's apartment. Further on, waste from apartments and other households may have to be collected and transferred out from a building.

SUMMARY

According to a first aspect of the present invention, a transportation system for a building with multiple floors is proposed. The transportation system comprises a traction sheave drive type elevator for vertically conveying persons and a lift for vertically conveying objects such as autonomous mobile robots or goods. The elevator comprises an elevator car which is vertically movable in a shaft. The lift comprises a lift platform which is vertically movable in the same shaft. The elevator car is preferably guided along at least one car guide means in the shaft. The elevator further comprises at least one counterweight which is preferably connected with the car via at least one suspension means and which is movable together with the car in the shaft in a direction of movement opposite to the direction of movement of the elevator car. The elevator car and the counterweight are driven by at least one drive engine with a traction sheave. The counterweight may be movable along at least one counterweight guide means in the shaft.

The lift for vertically conveying objects is based on a different drive type than the elevator leading to a beneficial redundancy and flexibility. The lift has a lift platform, which is at least temporary located in the shaft, and which is with respect to the elevator independently vertically movable in the shaft. The lift platform, when being in the shaft, at least partly overlaps a vertical projection of the elevator car. Thereby preferably, the vertical projection of the lift platform is smaller than the vertical projection of the elevator car.

This transportation system provides an efficient and effective way to vertically convey persons and unmanned objects in a building. The use of the same shaft also provides significant cost advantages with respect to investment and expenses over the time. The lift can, for example, be used for the vertical transportation of autonomous robots or vehicles between floors for waste collection and disposal in residential buildings. The robots may be designed as household robots. Another favorable application of the lift may be postal services and parcel delivery within the building.

It appears that thanks to the compact and smaller design of the lift or lift platform, in comparison with the elevator, the lift can be operated in a way that the performance of the elevator is not or only marginally affected. In a preferred embodiment, the transportation system is characterized in that a base area occupied by the vertical projection of the lift platform is preferably less than 80% and particularly preferably less than 60% of a base area occupied by the vertical projection of the elevator car.

In the shaft the lift platform may be, at least temporarily, positioned below the elevator car. However, when applying special arrangements of the traction sheave drive type elevator, the lift platform, at least temporarily, being positioned above the elevator car may even be conceivable.

Further, the lift may comprise more than one lift platform. In this case the lift platforms can be arranged vertically one above the other.

The lift platform may be a singular structure having basically a plate like form or flattened configuration. Nevertheless, for special requirements the lift may comprise a lift cage, whereby the lift platform defining a floor of the cage.

The elevator car and the lift platform may essentially have the same width. Thus, the lift platform might, with respect to its depth, be shortened compared to the elevator car such that the depth of the lift platform is preferably less than 80% and particularly preferably less than 60% of the depth of the elevator car. The measuring direction for the width would be rectangular to the measuring direction for the depth of the car. The depth is measured along a direction from the front to the rear side of the shaft.

For an undisturbed and safe interaction of passenger flow and flow of the objects it may be advantageous that the shaft comprises a plurality of elevator shaft doors for providing access for passengers into the elevator car, the plurality of elevator shaft doors being arranged at a front side of the shaft and at least one of the elevator shaft doors being arranged at each of multiple floors, and that the shaft comprises a plurality of lift shaft doors for providing access for objects onto the lift platform, the plurality of lift shaft doors being arranged at a rear side opposite to the front side of the shaft and at least one of the lift shaft doors being arranged at each of multiple floors, each of the latter floors preferably being arranged on the same level as a neighboring floor of the floors at the front side of the shaft. Each of the lift shaft doors may have an associated door drive for reciprocally opening and closing the lift shaft door.

However, it would also be conceivable that, instead at the rear side, the lift shaft doors may be arranged at one of the lateral sides of the shaft.

It may be particularly advantageous for the multiple floors associated with the elevator shaft doors at a front side of the shaft comprising a lowermost floor and, of course, at least one upper floor, and that the multiple floors associated with the lift shaft doors at a rear side (or at a lateral side) of the shaft comprising at least one floor which is arranged below the lowermost floor associated with the elevator shaft doors at a front side. The latter of the at least one floor being arranged below the lowermost front sided floor may be facing the exterior of the building and/or may be, by way of example, a goods receiving point or a robots storage place.

The elevator may be configured as a so-called backpack elevator. The elevator car may be supported on a rucksack frame. However, the backpack elevator may be frameless as well. The counterweight may be movable along a lateral side of the shaft. The elevator car may be guided along at least one and preferably two car guide means and the counterweight may be guided along at least one and preferably two counterweight guide means. The car guide means and counterweight guide means are located at the same lateral side of the shaft. Suspension means may be driven by the drive unit with the traction sheave and may be guided in such a manner over deflecting rollers arranged laterally at the elevator car that, with respect to the vertical projection or considered in a plan view of the elevator, the suspension means run over their entire length outside the base area of the elevator car.

The elevator car may be a front side supported car which is guided along a pair of opposing car guide means, whereby each of the two car guide means being arranged at one of the lateral sides of the shaft (and, thus, of the elevator car) and in a region close to the front side of the shaft. Thus, such an elevator could be described as a "frontsack elevator".

Especially for providing a compact and balanced frontsack elevator design it may be advantageous for the elevator comprising two opposing counterweights, whereby the counterweights being located at the opposing laterals sides of the shaft.

It may be particularly advantageous when these counterweights are guided along counterweight guide means, whereby the counterweight guide means and the car guide means on each lateral side of the shaft are formed by a common guide rail profile which is, for example, preferably a hollow rail profile and more preferably be formed as a rolled metal profile defining a monolithic body. Such a guide rail profile is simply mountable in the shaft.

The counterweights horizontally may maximally extend to a virtual boundary line defined by a nearest border of the vertical projection of the lift platform. In other words, each of the two opposing counterweights extends into the depth in the lateral direction, but, does not interfere into the projection of the lift platform. Thus, a trouble-free and safe operation of the transportation system can easily be ensured.

For a powerful transportation system it may be advantageous for the lift being a self-propelled lift, whereby the lift platform of the propelled lift comprising at least one drive unit for climbing up and down in the shaft. The advantageous combination of the traction sheave drive type elevator and the self-propelled lift ensures a high range of flexibility. For example, the self-propelled lift may comprise a lift platform with a vertically acting friction wheel drive system, friction wheels being pressed in horizontal direction to an associated shaft or a guide rail. Other drive solutions might be applicable such as linear drives enabling the lift platform climbing up and down in the shaft.

The transportation system may comprise for guiding the lift platform of the self-propelled lift, at least two and preferably four guiding units, which are arranged in the shaft. The respective guiding unit may be formed by a guide rail. The guide rail may be formed as a hollow profile. Two of the four guiding units may be arranged at or on the opposing laterals sides of the shaft. For example, each of the four guiding units may interact with an associated wheel motorized by a drive unit of the at least one drive unit.

It may be advantageous for the respective drive unit being designed as a gearwheel drive. The lift platform of the self-propelled lift may comprise at least two and preferably four motorized gearwheels capable of interacting with the associated at least two and preferably four guiding units. These guiding units may be equipped with climbing aids such as toothed racks, toothed belts or roller chains. Each guiding unit may comprise or being formed by a guide rail. Instead of one gearwheel per guiding unit it would also be conceivable that per guiding unit more than one gearwheel which would be grouped together may be foreseen.

When four guiding units are provided, it may be particularly advantageous, for the guiding units comprising two pair of vertical posts and roller chains, whereby one of the roller chains being attached to each of the posts and extending parallel to the posts, and whereby the roller chains being intended to receive the associated gearwheel. Such roller chains provide a kind of a climbing ladder at lower costs. Roller chains further are easily maintainable. The vertical posts may be formed as hollow profiles.

In a preferred embodiment the lift platform of the lift is a mobile lift platform being designed as a vehicle which can be brought in and out of the shaft and which can be moved in the floors, whereby the lift platform comprising rolling wheels for being capable of being moved on a floor. It may be particularly advantageous for the lift platform being designed as an autonomous vehicle which may also be known as "robo-car" or the like. Such vehicle that is capable of sensing its environment and moving safely with no human input. Especially, the autonomous vehicle is capable of moving on the floors and may be used for different tasks, such as for the distribution of goods. These vehicles may also be integrated in a waste flow management of the building. Autonomous vehicle may combine a variety of sensors to perceive their surroundings, such as radar, laser, lidar, sonar, GPS, odometry and inertial measurement units. Autonomous vehicle may comprise control systems being capable of interpreting sensory information to identify appropriate navigation paths, as well as obstacles and relevant signage. The mobile lift platform may be designed as an automatic guided vehicle (AGV) that, for example, follows along marked lines or wires on the floor.

Each of the lift shaft doors may comprise controllable lift shaft door drives for reciprocally opening and closing the lift shaft doors, whereby the lift shaft door drives may be controlled by the above described mobile lift platform, or, when the lift platform is permanently installed in the shaft, may be controlled by autonomous robots as objects to be conveyed on the lift platform.

According to a further aspect, the lift may comprise at least one signal receptor for receiving signals from autonomous robots as objects to be conveyed on the lift platform in the lift, a lift controller for controlling the operation of the lift. The lift controller can control the operation of the at least one lift drive engine in order to move the lift platform to the desired floor. Thereby, each of the lift shaft doors having an associated lift shaft door drive for reciprocally opening and closing the lift shaft door and a lift shaft door drive controller for controlling an operation of the lift shaft door drives of the lift shaft doors, wherein the at least one signal receptor being connected with the lift controller and the lift shaft door drive controller in such a way that the autonomous robots is able to call the lift platform to a desired floor, enter via the opened lift shaft door the lift platform and drive with the lift platform to a destination floor.

For a reliable functioning of the transportation system a host elevator and lift controller may be provided. The host elevator and lift controller is designed such that it is able to control the movements of the elevator car and the lift platform so that collisions of the elevator car and the lift platform can be prevented.

When the lift platform is a mobile lift platform being designed as a vehicle which can be brought in and out the shaft, at least a partial control of a lift controller might be located on the lift platform. Also in this case each of the lift shaft doors may have an associated lift shaft door drive for reciprocally opening and closing the lift shaft door and a lift shaft door drive controller for controlling an operation of the lift shaft door drives of the lift shaft doors, wherein the at least one signal receptor being connected with mentioned partial control of a lift controller on the mobile lift platform and the lift shaft door drive controller in such a way that the mobile lift platform is able to open the lift shaft door so that the lift platform can enter and be brought into the shaft. Afterwards, the lift platform can autonomously drive to a destination floor. However, the host elevator and lift controller may override the local lift controller on the mobile lift platform and/or the elevator controller in order to prevent a collision with the elevator car.

As from above described plurality of signal receptors for receiving signals from autonomous robots or from the mobile lift platform, at least one of the signal receptors being arranged in the vicinity of the lift shaft doors at each of the associated multiple floors.

The plurality of signal receptor may receive the requesting signal via short range wireless data communication from a data communication device integrated or at least associated in the autonomous robot or in the mobile lift platform.

DESCRIPTION OF THE DRAWINGS

Different aspects of the enhanced technology are described in greater detail below with reference to exemplary embodiments illustrated in the figures. Identical elements are identified by the same reference symbols in the figures. In these figures.

DETAILED DESCRIPTION

Figure 1:
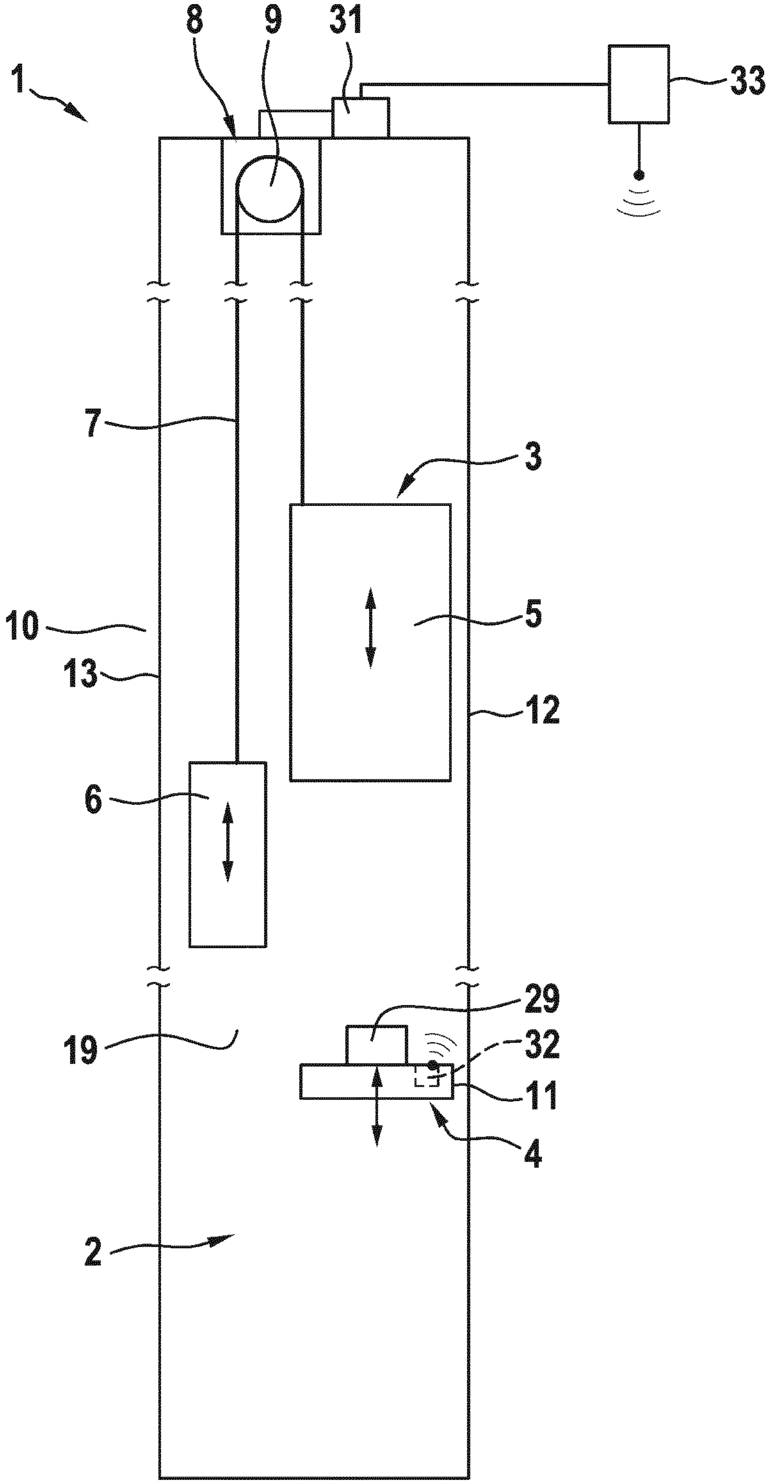
FIG. 1 refers to a schematic side view of the transportation system comprising a traction sheave drive type elevator and a lift in a common shaft according to an embodiment of the invention.

FIG. 1 shows a vertical transportation system 1 for a building 10 with multiple floors. The transportation system 1 comprises an elevator 3. The elevator 3 has an elevator car 5 which is arranged in a shaft 2 in the building 10 to be movable along a substantially vertical axis. The elevator car 5 serves primarily for the movement of persons. The elevator car 5 is, in the illustrated example, connected with a counterweight 6 by suspension means 7. Suspension means 7 for supporting the elevator car 5 and the counterweight 6 may be conceived as cables or belts or several cables or belts. For moving the elevator car 5 and the counterweight 6 use is made of a drive engine 8 with a traction sheave 9. The drive engine 8 of this traction sheave drive type elevator is, for example, arranged in the shaft head region of the shaft 2. Instead of the so-called machine-room-less elevator 3 it would also be conceivable to arrange the drive engine 8 in a separate engine room in the region of the shaft head. In this description, the term "building" refers, e.g., to residential buildings, office buildings, sports arenas or shopping centers, but also to ships.

The transportation system 1 further comprises a lift 4 for vertically conveying objects. The lift 4 comprises a lift platform 11 which at least temporarily is located in the shaft 2. The lift platform 11 may be permanently installed in the shaft 2. On such a lift platform 11 autonomous mobile robots (e.g. household robots) or other unmanned objects 29 can be conveyed. However, for a particularly advantageous transportation system 1 the lift platform 11 is designed as a mobile lift platform which can move on the floors of the building and which is only located or installed in the shaft 2 for moving up and down for approaching different floors. The mobile lift platform 11 may carry and transport goods 29 as loose items on the upper side of the platform or using special containers.

The lift 4 is based on a different drive type than the elevator 3. Thus, the lift platform 11, which may be guided along (not shown here, but see FIG. 4) lift platform guide means, is, with respect to the elevator car 5, independently vertically movable in the shaft 2. In the present embodiment, the lift 4 is designed as a self-propelled lift, whereby the lift platform 11 comprises at least one (not shown) drive unit for climbing up and down in the shaft 2. The combination of the traction sheave drive type elevator 3 and the self-propelled lift 4 ensures a high range of flexibility.

The traction sheave drive type elevator 3 comprises an elevator control system with an elevator controller 31 for controlling the operation of the drive engine 8 for displacing the elevator car 5 during operation for example in response to calls received from one of multiple (not shown) landing operation panels provided at each of the floors in the building and/or from a (not shown) car operation panel provided within the elevator car 5. The elevator controller 31 processes a received elevator call and activates the drive engine 8 accordingly in order to move the elevator car 5 in the shaft 2 with the aid of the suspension means 7. The elevator control system also comprises a (not shown) door controller for controlling the operation of the (not shown) car door and elevator shaft doors. The car door of the elevator car 5 and the respective shaft door are opened upon arrival of the car on the desired floor. These shaft doors for accessing the elevator car 5 would be, in the exemplary embodiment illustrated in FIG. 1, arranged at a front side 12 of the shaft 2. The opposite side of the shaft 2 which is hereinafter called rear side is denoted with 13. The shaft 2 further comprises two lateral sides 19 connecting the front side 12 with the rear side 13.

The lift platform 11 comprises a lift controller 32 controlling the movement of the lift platform 11 to the desired floor. In the exemplary embodiment, the lift controller 32 further comprising a transmitting and receiving unit which is designed for transmitting and receiving radio signals in order to communicate wirelessly via a communication network with a host elevator and lift controller 33. The transmission may be realized in accordance with previously mentioned mobile radio communication technology (e.g. a WLAN/WiFi system, 4G/LTE (long-term evolution)) or one or more technologies such as IP (Internet protocol) technology or a wire-bound technology (e.g. Ethernet technology). Among other functions, the host elevator and lift controller 33 ensures a safe operation of the transportation system 1 and especially that no collision between the elevator car 5 and the lift platform 11 does occur.

The lift platform 11 which is positioned below the elevator car 5 at least partly overlaps a vertical projection of the elevator car 5. In the exemplary embodiment illustrated in FIG. 1, the access provided by (not shown here) lift shaft doors for the lift platform 11 may be arranged at one of the lateral sides 19 of the shaft 2. Contrary to this, in the following FIG. 2 referring to another exemplary embodiment the access for the lift platform 11 is arranged at a rear side 13 of the shaft 2.

Figure 2:
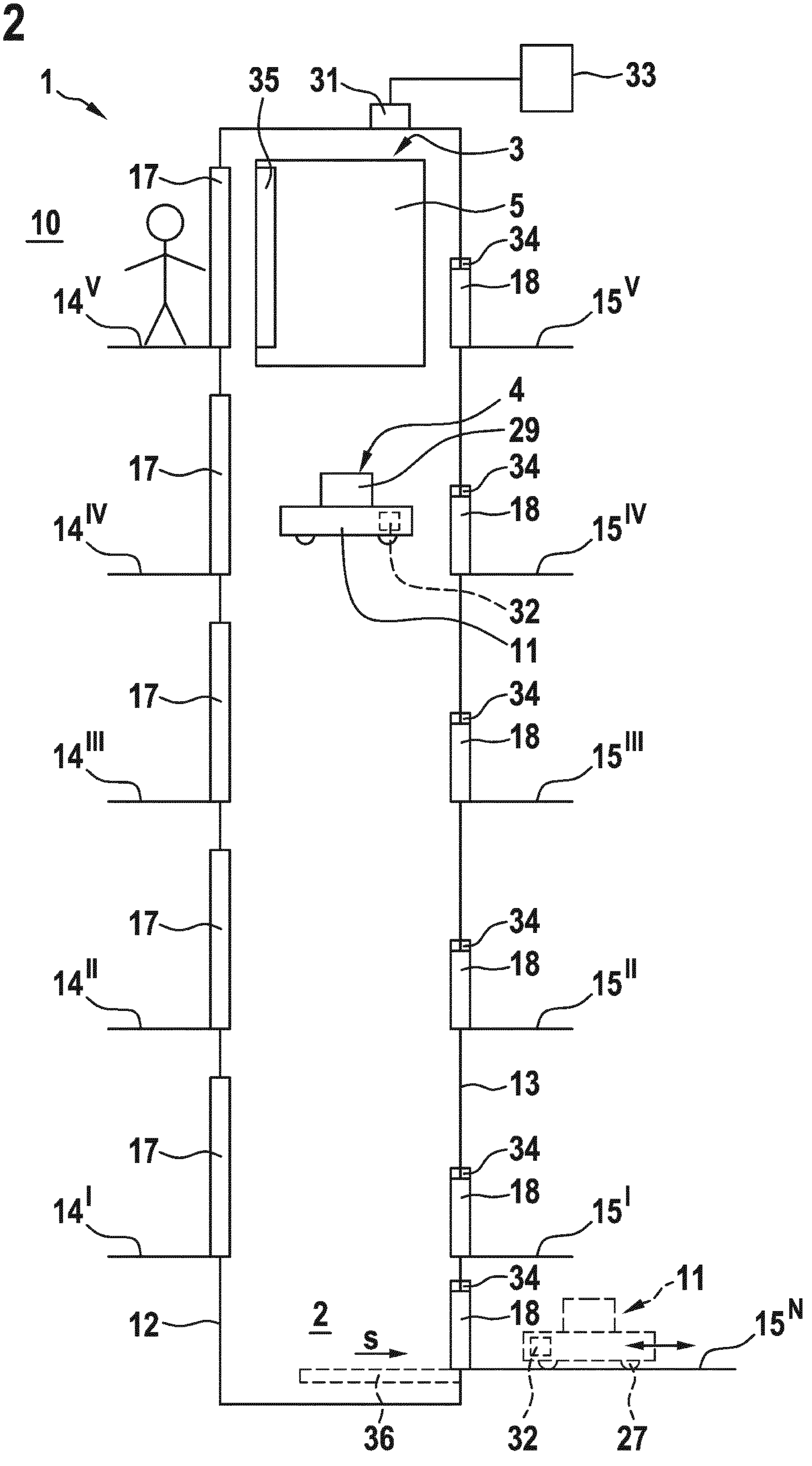
FIG. 2 shows another schematic illustration of the inventive transportation system.

FIG. 2 shows a schematic and simplified representation of a partially illustrated building 10 in which a shaft 2 with a traction sheave drive type elevator 3 and a lift 4 for vertically conveying objects based on a different drive type than the elevator in the manner as described before are provided. In the exemplary embodiment illustrated in FIG. 2, the building 10 has multiple floors 14 and 15. The floors denoted with 14 are associated with the front side 12 of the shaft 2, whereby those floors comprise a first floor 14', a second floor 14" and so on; the uppermost floor which here exemplary is a fifth floor **14*v*. Passengers can enter the elevator car 5 from this front side 12 via an elevator shaft door 17 and an adjacent car door 35. On the opposite rear side 13 of the shaft 2 a plurality of lift shaft doors 18 are arranged whereby the shaft doors 18 provide access for the lift platform 11. These shaft doors 18 which at least with respect to the height have smaller dimensions are intended to provide access of unmanned objects and shall not serve as a normal people access. The respective floors, i.e. the floors 14', 14", 14'", 14'$^{V}$, 14$^{V}$ and the floors 15', 15", 15'", 15'$^{V}$, 15$^{V}$, when on the same level may be connected to a common story, so that, for example, a person present at floor 14$^{V}$ can reach the floor 15$^{V}$ by walking via (not shown here) passages or hallways in the building 10. The multiple floors 14 associated with the elevator shaft doors 17 at the front side 12 of the shaft 2 have a lowermost floor 14'. As can be seen in FIG. 2 the multiple floors 15 associated with the lift shaft doors 18 at the rear side 13 of the shaft 2 comprise a floor 15N which is arranged below the lowermost floor 14'. This floor 15**N serves as a main entry floor which for instance may exclusively be intended for the traffic of autonomous vehicles, robots and other unmanned objects coming from outside via a (not shown) building entrance or from storage facilities or waiting areas.

FIG. 2 further shows that each of the lift shaft doors 18 comprise controllable lift shaft door drives 34 for reciprocally opening and closing the lift shaft doors 18. For opening and closing the lift shaft doors 18 the lift shaft door drives 34 can be controlled by the mobile lift platform 11. Therefore, the lift controller 32 integrated in the mobile lift platform 11 has, as shown in FIG. 1, a transmitting and receiving unit which is designed for transmitting and receiving radio signals in order to communicate wirelessly with a (not shown) signal receptor which is associated with the lift shaft door drive 34. The mobile lift platform 11 is designed as a vehicle which can be brought in and out the shaft 2 and which can be moved on the floors. Rolling wheels 27 are provided for the mobile lift platform 11 so that the lift platform 11 (illustrated by dashed lines) is capable of being moved on a floor.

The host elevator and lift controller 33 which is arranged in the building 10 comprises an interface. The interface is communicatively linked to the elevator controller 31. In addition, the interface is communicatively linked to a processing unit of the lift platform 11, which processing unit can be the before mentioned lift controller 32. The interface generally serves for transmitting data as well as for their storage; it is accordingly designed for at least one of these purposes. According to an exemplary embodiment the interaction between the interface and the lift platform 11 may take place via a network. The network may comprise a mobile communication network that allows communications in accordance with one of the known mobile radio communication standards; it may be realized, for example, in the form of a GSM, UMTS or LTE mobile communication network. The network may further comprise a data network, which may be part of an IT infrastructure for so-called cloud computing. The cloud computing refers, for example, to the storage of data in a remote computer center, but also to the execution of programs that are not installed locally, but rather remotely. Depending on the respective design, a certain functionality may be made available, for example, in the interface or via the "cloud." For example, a software application or program portions thereof may for this purpose be executed in the cloud. In this case, the interface accesses this infrastructure on demand in order to execute the software application.

Figure 3:
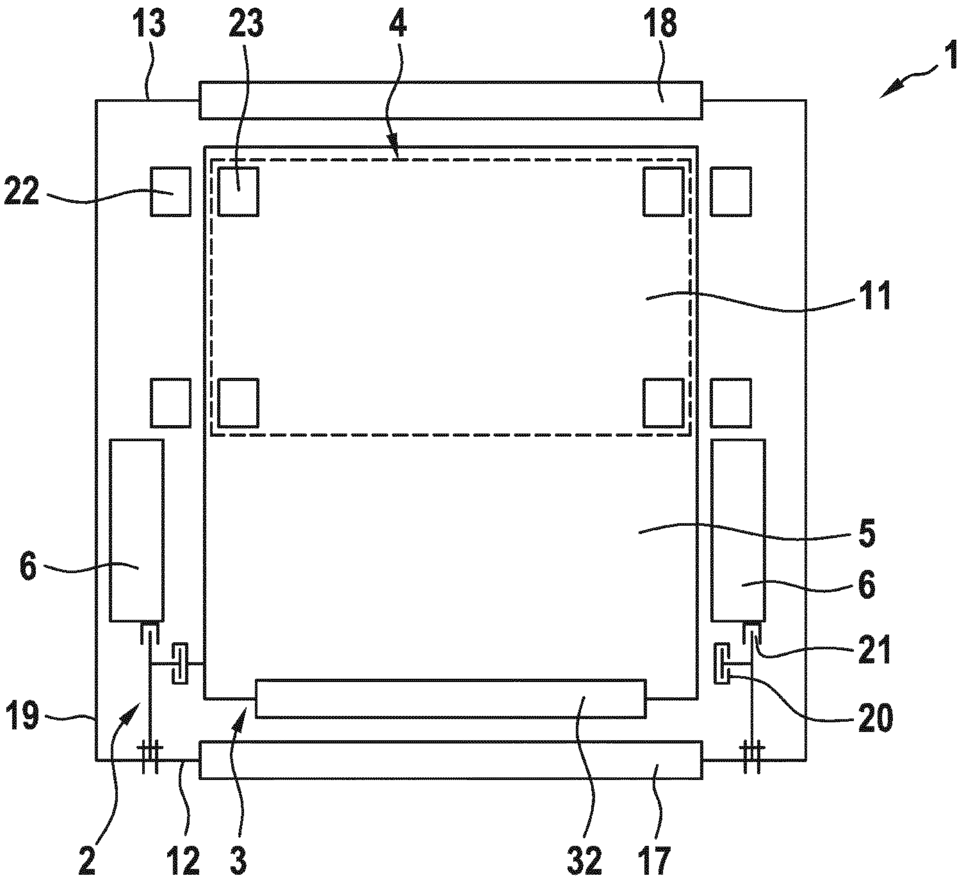
FIG. 3 shows the elevator of the transportation system in a simplified top view according to a further embodiment of the invention.
Figure 4:
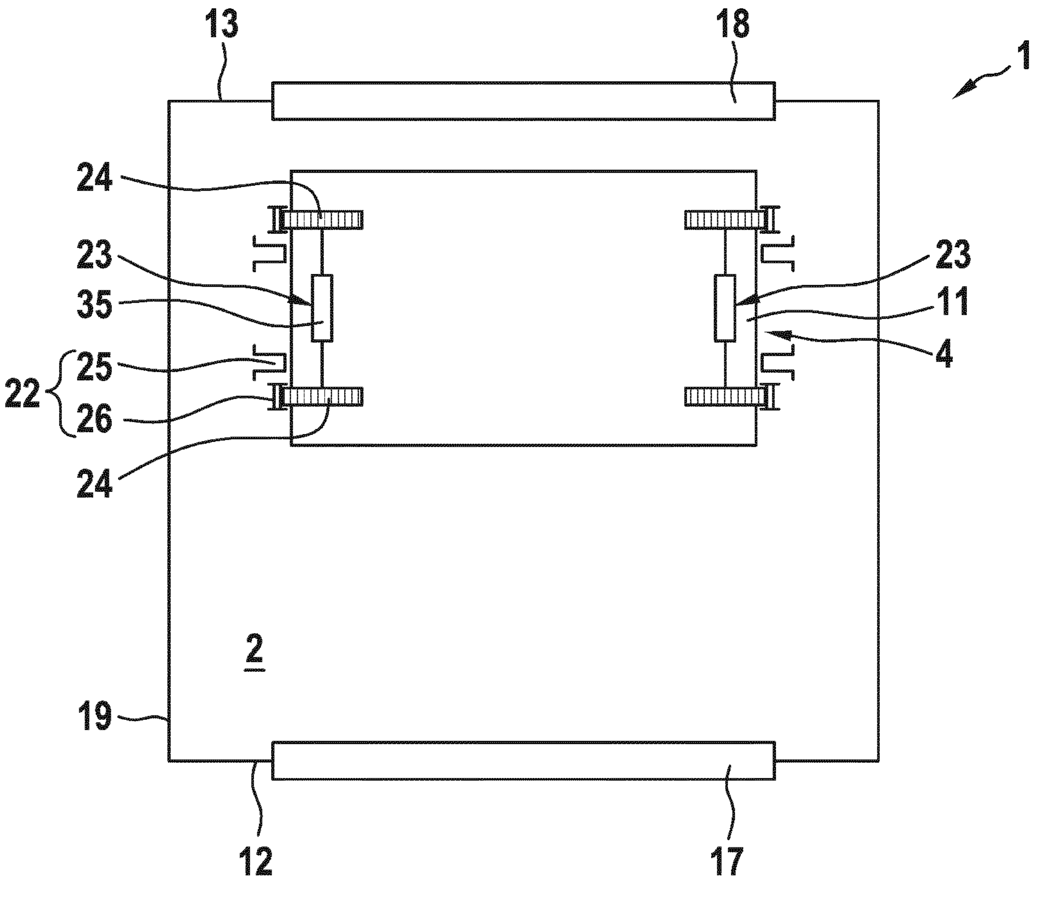
FIG. 4 shows a lift platform of the lift of the transportation system from FIG. 3.

FIGS. 3 and 4 refer to schematic representations of an exemplary embodiment of the transportation system 1. In FIG. 3 the elevator car 5 of the traction sheave drive type elevator 3 is illustrated showing some technical details; the lift platform 11 of the lift 4 for vertically conveying objects is indicatively illustrated by dashed lines. Lift guiding units 22 for guiding the lift platform 11 as well as the climbing drive units 23 for climbing up and down are symbolically shown (cf. FIG. 4 below).

The lift platform 11, when located in the shaft for moving up and down, overlaps the vertical projection of the elevator car 5, whereby the vertical projection of the lift platform 11 is considerably smaller than the vertical projection of the elevator car 5. In the exemplary embodiment according to FIG. 3, the lift platform 11 essentially is completely projecting within the elevator car 5. This projection condition also includes arrangements whereby a minor rear sided section of the lift platform 11 may lie outside the vertical projection of the car. For an easy access and handling with respect to the lift platform 11 it may be advantageous that the lift platform 11 being close and more preferably in the immediate vicinity of the rear side 13 of the shaft 2 provided with the adjacent lift shaft doors 18. A base area occupied by the vertical projection of the lift platform 11 is approximately 50% of a base area occupied by the vertical projection of the elevator car 5.

The elevator car 5 is a front side supported car which is guided along a pair of opposing car guide means 20, whereby each of the two car guide means 20 being arranged at one of the lateral sides 19 of the shaft 2 (and thus at the lateral sides of the car) and in a region close to the front side 12. The elevator 3 comprises two opposing counterweights 6, whereby the counterweights 6 being located at the opposing laterals sides 19 of the shaft 2. The counterweights 6 horizontally maximally extend to a virtual boundary line defined by a nearest border of the vertical projection of the lift platform 11.

The counterweights 6 are guided along counterweight guide means 21. In the present embodiment, the counterweight guide means 21 and the car guide means 20 on each lateral side 19 of the shaft 2 are formed by a common guide rail profile which is, for example, made of a monolithic rolled metal profile. Further details with respect to this frontsack elevator having the special configuration of the common guide rail profile and counterweights can be found in the applicant's PCT applications PCT/EP2019/085699 (WO 2020/127303 A1) and PCT/EP2019/086382 (WO 2020/127787 A1) which disclosure shall be involved hereinafter. The elevator 3 comprises two drive engines 8 (not shown here), whereby for each of the counterweights one drive engine is provided.

FIG. 4 shows the transportation system 1 for a better understanding and overview with respect to the lift 4 without the elevator 3. The lift platform 11 of the self-propelled lift 4 comprises two drive units 37 for climbing up and down in the shaft 2, whereby each of the two drive units 37 motorizes two gearwheels 24. Thus, the lift platform 11 comprises four gearwheels 24. Four guiding units 22 are arranged in the shaft 2, whereby two of the four guiding units 22 are arranged at or on the opposing laterals sides 19 of the shaft 2. The guiding units 22 comprise two pair of vertical posts 25 and roller chains 26, one of the roller chains 26 being attached to each of the posts 25 and extending parallel to the posts 25, whereby the roller chains 26 being intended to receive the associated gearwheel 24. The posts 25 may be formed as hollow rail profiles. A similar lift platform having motorized gearwheels as well as roller chains and vertical posts so that the lift platform can climb up and down has been disclosed in WO 2018/189110 A1 which, however, refers to a different technical field. Surprisingly the applicant found out that such a lift platform from an order-picking system vertically driving between racks can be advantageously be implemented in a vertical transportation system in a building, the building having floors between the transport shall take place.

The lift platform 11 is designed as an autonomous vehicle for supplying goods which can be brought in and out the shaft 2 and which can be moved in the floors 15. For being capable of being moved on a floor 15 the lift platform comprises motorized rolling wheels 27 (see FIG. 2). The lift platform 11 then functions like a robo-car which is capable of sensing its environment and moving safely on the floors with no human input. Alternatively, the mobile lift platform 11 may be designed as an AGV that, for example, follows along marked lines or wires on the floor.

FIG. 2 exemplarily shows how such a mobile lift platform 11 can be brought into the shaft 2. The shaft 2 comprises extendable platforms or ramps 36 arranged on each floor 15. The ramp 36 is designed such that it can extend from a rest position to an extended position. For the activation of the controllable ramp 36 a (not shown) sliding drive may be provided which may be electronically coupled with the lift door controller for controlling the operation of the lift shaft door 18. An extended ramp 36 associated with the main entry floor 15N is illustrated by dashed lines. Thanks to the ramp 36 the mobile lift platform 11 is able to move from the floor 15N via the extended ramp 36 into the shaft 2. Then, the mobile lift platform 11 docks itself to the lift guiding units and is ready for climbing up and down in the shaft 2. After the docking procedure the ramp 36 slides back to the resting position. The respective closing movement of the ramp 36 is indicated by an arrow s. In this resting position the ramp is fully retracted and allows an unimpeded climbing up and down of the mobile lift platform 11. The shaft 2 may be a pitless shaft. In this case the mobile lift platform 11 can move from the entry floor 15N into the shaft 2 without the need of such a ramp 36. The extendable ramp 36 may comprise a plurality of elements forming a telescopic ramp.

Other transfer means for the transfer of the mobile lift platform 11 from a floor 15 into the shaft 2 would also be conceivable. For example, instead of the extendable ramps 36 as described above, foldable ramps may be provided on each floor 15, whereby the foldable ramp can, after activation, be moved in a pivotable manner from a vertical resting position to a horizontal drive up position.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A transportation system for a building with multiple floors, the transportation system comprising:

a shaft;

a traction sheave drive type elevator for vertically conveying persons, the elevator having an elevator car movable in the shaft and at least one counterweight movable together with the elevator car in the shaft in a direction of movement opposite to a direction of movement of the elevator car, the elevator car and the counterweight being driven by a traction sheave drive type including a drive engine with a traction sheave; and a lift for vertically conveying objects based on a different drive type than the elevator, the different drive type not being a traction sheave drive type, the lift having a lift platform movable in the shaft, wherein the lift platform overlaps at least partly a vertical projection of the elevator car, and wherein a vertical projection of the lift platform is smaller than the vertical projection of the elevator car.

2. The transportation system according to claim 1 wherein a base area occupied by the vertical projection of the lift platform is less than 80% of a base area occupied by the vertical projection of the elevator car.

3. The transportation system according to claim 2 wherein the base area occupied by the vertical projection of the lift platform is less than 60% of the base area occupied by the vertical projection of the elevator car.

4. The transportation system according to claim 1 wherein the shaft has a plurality of elevator shaft doors providing access for passengers into the elevator car, each of the elevator shaft doors being arranged at an associated one of the floors at a front side of the shaft, and wherein the shaft has a plurality of lift shaft doors for providing access for the lift platform or for objects onto the lift platform, each of the lift shaft doors being arranged at an associated one of the floors at a rear side of the shaft opposite to the front side, each of the floors at the rear side being arranged on a same level as a neighboring one of the floors at the front side.

5. The transportation system according to claim 4 wherein the floors associated with the elevator shaft doors at the front side of the shaft include a lowermost floor and the multiple floors associated with the lift shaft doors at a rear side of the shaft include at least one floor that is arranged below the lowermost floor.

6. The transportation system according to claim 1 wherein the elevator car is a front side supported car that is guided along a pair of opposing car guide means, wherein each of the car guide means is arranged at one of two lateral sides of the shaft and in a region adjacent to a front side of the shaft.

7. The transportation system according to claim 6 wherein the elevator includes two opposing counterweights, each of the counterweights being located at one of the lateral sides of the shaft, wherein the counterweights are guided along counterweight guide means, the counterweight guide means and the car guide means on each of the lateral sides being formed by a common guide rail profile.

8. The transportation system according to claim 1 wherein the elevator includes two opposing counterweights, the counterweights being located at opposing laterals sides of the shaft.

9. The transportation system according to claim 1 wherein the lift is a self-propelled lift, the lift platform of the self-propelled lift having at least one climbing drive unit for climbing up and down in the shaft.

10. The transportation system according to claim 9 including at least two lift guiding units arranged in the shaft for guiding movement of the lift platform.

11. The transportation system according to claim 10 wherein the lift platform of the self-propelled lift has at least two motorized gearwheels interacting with the lift guiding units.

12. The transportation system according to claim 11 including four of the lift guiding units and four of the gearwheels, each of the lift guiding units including a vertical post and a roller chain attached to and extending parallel to the post, wherein each of the roller chains receives an associated one of the gearwheels.

13. The transportation system according to claim 12 wherein the posts are formed as hollow rail profiles.

14. The transportation system according to claim 1 wherein the lift platform is a mobile lift platform being a vehicle that can be brought in and out of the shaft and having rolling wheels for movement on the floors.

15. A transportation system for a building with multiple floors, the transportation system comprising:

a shaft;

a traction sheave drive elevator for vertically conveying persons, the elevator having an elevator car movable in the shaft and at least one counterweight movable together with the elevator car in the shaft in a direction of movement opposite to a direction of movement of the elevator car, the elevator car and the counterweight being driven by a drive engine with a traction sheave;

a lift for vertically conveying objects based on a different drive type than the elevator, the lift having a lift platform movable in the shaft, wherein the lift platform overlaps at least partly a vertical projection of the elevator car, and wherein a vertical projection of the lift platform is smaller than the vertical projection of the elevator car; and wherein the shaft has a plurality of lift shaft doors for providing access for the lift platform or for objects onto the lift platform, each of the lift shaft doors being arranged at an associated one of the floors at a rear side of the shaft, each of the lift shaft doors having an associated controllable lift shaft door drive for reciprocally opening and closing the associated lift shaft door, wherein the lift platform is a mobile lift platform being a vehicle that can be brought in and out of the shaft and having rolling wheels movement on the floors, and wherein the lift shaft door drives are controlled by the mobile lift platform.

16. A transportation system for a building with multiple floors, the transportation system comprising:

a shaft;

a traction sheave drive elevator for vertically conveying persons, the elevator having an elevator car movable in the shaft and at least one counterweight movable together with the elevator car in the shaft in a direction of movement opposite to a direction of movement of the elevator car, the elevator car and the counterweight being driven by a drive engine with a traction sheave;

a lift for vertically conveying objects based on a different drive type than the elevator, the lift having a lift platform movable in the shaft, wherein the lift platform overlaps at least partly a vertical projection of the elevator car, and wherein a vertical projection of the lift platform is smaller than the vertical projection of the elevator car; and wherein the shaft has a plurality of lift shaft doors for providing access for the lift platform or for objects onto the lift platform, each of the lift shaft doors being arranged at an associated one of the floors at a rear side of the shaft, each of the lift shaft doors having an associated controllable lift shaft door drive for reciprocally opening and closing the associated lift shaft door, wherein the lift platform remains in the shaft, and wherein the lift shaft door drives are controlled by autonomous robots as objects conveyed on the lift platform.

* * * * *